United States Patent [19]
Corallo et al.

[11] Patent Number: 5,336,464
[45] Date of Patent: Aug. 9, 1994

[54] EXTRUSION BLOW MOLDING OF THERMOTROPIC LIQUID CRYSTALLINE POLYMERS

[75] Inventors: Cheryl F. Corallo, Charlotte, N.C.; Robert B. Sandor, Cliffside Park, N.J.; Ralph S. Blake, Lake Wylie, S.C.

[73] Assignee: Hoechst Celanese Corporation, Somerville, N.J.

[21] Appl. No.: 979,102

[22] Filed: Nov. 20, 1992

[51] Int. Cl.$^5$ ............................................. B29C 49/04
[52] U.S. Cl. .................................. 264/540; 528/176; 528/194
[58] Field of Search ............................ 264/540–543, 264/176.1; 528/194, 176

[56] References Cited

U.S. PATENT DOCUMENTS

| | | | |
|---|---|---|---|
| 4,071,503 | 1/1978 | Thomas | 264/540 |
| 4,101,601 | 7/1978 | Thomas | 525/438 |
| 4,183,895 | 1/1980 | Luise | 264/176.1 |
| 4,540,737 | 9/1985 | Wissburn et al. | 524/599 |
| 4,605,727 | 8/1986 | Inoue et al. | 264/176.1 |
| 4,663,422 | 5/1987 | Inoue et al. | 528/176 |
| 4,799,985 | 1/1989 | McMahon et al. | 156/166 |
| 4,942,005 | 7/1990 | Pollock et al. | 264/540 |
| 5,085,807 | 2/1992 | Okamoto et al. | 252/609 |
| 5,150,812 | 9/1992 | Adams | 220/414 |
| 5,202,064 | 4/1993 | Furusawa et al. | 264/176.1 |

FOREIGN PATENT DOCUMENTS

| | | | |
|---|---|---|---|
| 62-095213 | 5/1987 | Japan | 264/512 |
| 65-199622 | 8/1988 | Japan | 264/514 |
| 3219939 | 9/1991 | Japan | 264/540 |

OTHER PUBLICATIONS

"Plastics World," Ju., 1988, p. 11.
"Advanced Material," 10(10), Jun. 27, 1988, p. 2.
Blizard, K. G. et al, "Blow Molding Thermotropic Liquid Crystalline Polymers", Intern. Polymer Processing IV, 1989, Hanser Publishers, Munich.
Vectra® Product Literature, Hoechst Celanese Corporation 1989.

*Primary Examiner*—Catherine Timm
*Attorney, Agent, or Firm*—R. H. Hammer, III

[57] ABSTRACT

An extrusion blow molding process for a heat-treated, liquid crystalline polymer is provided. By the process, molten polymer having improved melt strength, is vertically extruded downward into space through a parison-forming, annular gap. Sag resistant parisons are formed. Beneficially, the parisons may be formed periodically. Advantageously, large-sized parts or structures may be produced.

6 Claims, 1 Drawing Sheet

EXTRUSION BLOW MOLDING OF THERMOTROPIC LIQUID CRYSTALLINE POLYMERS

FIELD OF THE INVENTION

This invention relates to an extrusion blow moldable, liquid crystalline polymer.

BACKGROUND OF THE INVENTION

Extrusion blow molding is useful for making hollow parts or structures having a variety of uses. Containers such as tanks, pressure vessels, cylinders and bottles, which may be used for pressurized or compressed gases and cryogenic gases, may be conveniently formed by extrusion blow molding.

Liquid crystal or crystalline polymers (LCPs) are beneficially characterized by gas barrier properties, chemical resistance or inertness, high creep resistance, excellent retention of properties over a broad temperature range including lack of embrittlement at cryogenic temperatures, and a low coefficient of thermal expansion. However, liquid crystalline polymers are difficult to process by extrusion blow molding.

According to *Plastics World*, p. 11, July 1988 and *Adv. Mater.*, 10 (10), p. 2, Jun. 27, 1988, a moldable LCP is known. The LCP may be crystalline and moldable in 30% and 50% glass-reinforced formulations, or may be amorphous and extrudable, blow moldable and injection moldable in neat, glass-reinforced and glass/mineral formulations.

In continuous extrusion blow molding, parisons are continually formed and molds move into place to accept tubes of molten polymer. Continuous extrusion blow molding to impart biaxial orientation to a part made from a copolyester LCP (hydroxybenzoic acid and 6-hydroxy-2-naphthoic acid), has been attempted. In this regard, Blizard and Baird, *Intern. Polymer Processing*, 4:172–178 (1989), report forming a small part having no observed biaxial orientation, and rapid solidification to be a processing limitation. However, they report success and the benefit of relatively slow crystallization for a copolyester made from hydroxybenzoic acid and polyethylene terephthalate.

Processing difficulties are accentuated when a large-sized part is desired, and also when uniformity of wall thickness is important. Therefore, there is a need for an improved process for forming a liquid crystalline polymer into a hollow part or structure by extrusion blow molding.

SUMMARY OF THE INVENTION

In accordance with the present invention, a broadly applicable method for forming a hollow part or structure from an extrusion blow moldable, liquid crystal or crystalline polymer, is provided. In accordance with the invention, a melt strength-enhanced, liquid crystalline polymer is heated to a molten state, and in particular to a temperature suitable for extruding the polymer in the form of a sag resistant, stable parison. Beneficially, the polymer has been pre-heat treated at temperatures near its melting point to provide sag resistance and extrusion blow moldability.

Intermittent extrusion may be advantageously used to periodically form parisons from the molten polymer. To form the parison, a shot of the polymer melt is vertically extruded through an annular gap, generally downward into space. Sag resistance and stability of the parison are important.

At an appropriate time, typically after the parison has fallen to a desired length, a forming mold is clamped around the parison, and the parison is inflated causing it to take on the cavity form. After a suitable period of time for cooling, the mold is opened to provide the formed part or structure, which advantageously may range in size depending upon the mold selected.

BRIEF DESCRIPTION OF THE DRAWING

By the drawing there is schematically illustrated one approach for carrying out the present invention.

DETAILED DESCRIPTION OF THE INVENTION

Figure 1:
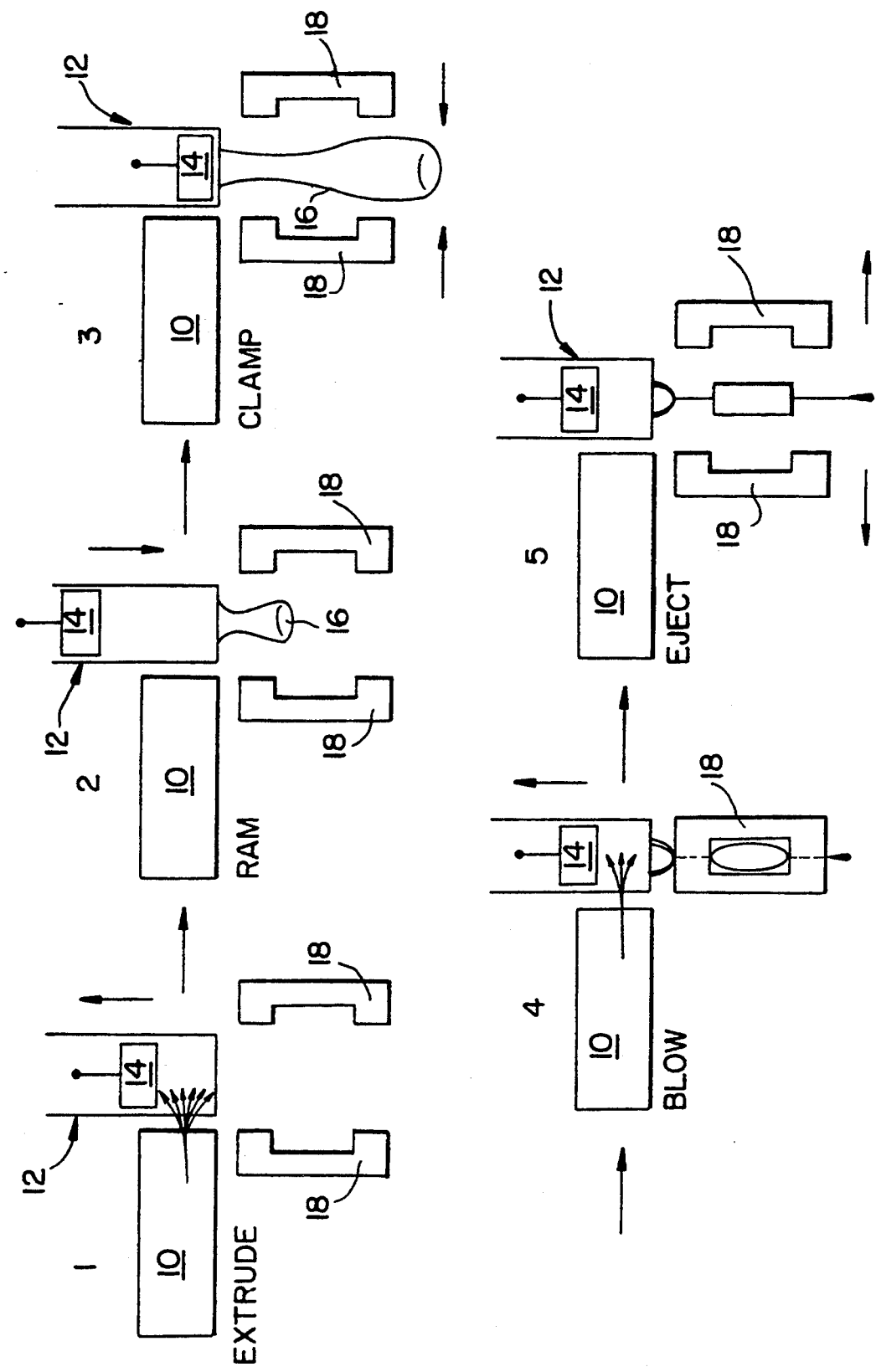

As indicated above, the present invention is directed to a method of broad applicability for extrusion blow molding a liquid crystalline polymer. The present invention beneficially utilizes a heat-treated, liquid crystalline polymer. By the invention, a large or small, hollow part or structure having gas barrier properties, may be economically and easily produced.

Particularly beneficial as heat-treated, liquid crystalline polymers for use in the process of the present invention, are thermotropic LCPs. Thermotropic LCPs exist in a liquid-crystalline state above their melting point, are anisotropic in the melt phase, and are melt processable. Thermotropic LCPs include, but are not limited to, wholly and non-wholly aromatic polyesters, aromatic-aliphatic polyesters, aromatic polyazomethenes, aromatic polyester-carbonates, and wholly aromatic and non-wholly aromatic polyester-amides. A variety of thermotropic LCPs are described in U.S. Pat. Nos. 4,540,737 and 4,799,985, which are hereby incorporated herein by reference.

The most preferred thermotropic LCPs for use in this invention include polyesters, in particular wholly aromatic polyesters. By the term "wholly aromatic polyester" as used in connection with this invention, is meant that the polyester backbone is made of aromatic monomers. Especially useful in this invention as a heat-treated LCP, is a wholly aromatic, thermotropic LCP prepared from p-hydroxybenzoic acid and 6-hydroxy-2-naphthoic acid monomers, commercially available from Hoechst Celanese Corporation of Somerville, N.J. under the registered trade mark VECTRA.

In accordance with the process of the present invention, a heat-treated, liquid crystalline polymer is used. By "heat-treated" is meant for purposes of this invention, that the LCP has been subjected to a melt strength-enhancing process at temperatures near its melting point. Processes of this type are known and commercially practiced for strengthening LCP fiber. See for example, U.S. Pat. No. 4,183,895 to Luise.

Generally speaking, the heat treatment is carried out for sufficient time at appropriate elevated temperature until the desired melt strength is obtained, with the particular requirements dependent upon the LCP selected. For an LCP having a melting point of for example, about 280° C., the heat treatment will beneficially be at temperatures of about 250° C. or more for up to about ten hours, preferably for about one-half hour to five hours at about 265 to 275° C.

For practical purposes, the heat treatment will be carried out for as short a period of time as is consistent with obtaining a given enhanced melt strength. Depending upon the polymer and the end use of the melt strength-enhanced polymer including the size of the part to be produced, heating periods from as little as thirty minutes or less to twenty-four hours or longer, may be appropriate. In general, the use of a relatively lower elevated temperature will require a relatively longer heating period to produce a given melt strength.

Advantageously, the heat treatment may be carried out at a temperature close to, for example, within about 10 to 30° C. of, but below the melting point. It is generally desirable to operate at the highest temperature permissible which is below the melting point and avoids undue polymer degradation. During the course of the heat treatment, the melting point of the polymer ordinarily increases somewhat, thus permitting the temperature to be increased. Accordingly, in one approach, the heat treatment may be carried out by subjecting the polymer to a series of stepwise temperature increases for an appropriate period of time at each step. Alternatively, the temperature may be raised as close as possible to, but short of, the melting point, and then maintained for the appropriate heating period.

The heat treatment may be beneficially conducted in an inert atmosphere, for example under nitrogen. The inert atmosphere may be continuously purged during the treating period by a flow of inert gas to remove any gaseous by-product.

After the heat treatment, the polymer may be allowed to cool to ambient temperature and stored. Exceeding the melting point and thereafter cooling the polymer may result in loss or reduction of the melt strength enhancement. Thus, heat-treatment is beneficially effected in the solid phase and below the melting point to provide a solid-stated polymer. Generally speaking, any heat-treatment technique may be used so long as the necessary melt strength-enhancement is provided.

A suitable melt strength is proven by the formation of a sag resistant, stable parison. High viscosity does not necessarily correlate to the necessary sag resistance and stability. In this regard, a high viscosity, liquid crystalline polymer commercially available under the trade name Vectra® B950, would not be suitable for use in the process of the present invention. Moreover, good sag resistance alone may not be sufficient; rather, the heat-treated LCP must also be characterized by good blow moldability as exemplified by complete filling of a mold and accurate replication of the interior mold surface.

The extent of melt strength enhancement necessary will depend upon, for instance the size of the part or structure desired. Generally speaking, a relatively larger part size will require relatively greater melt strength because of correspondingly greater hanging weight of the parison. In any event, the extent of melt strength enhancement will be sufficient to make the LCP extrusion blow moldable.

In accordance with the extrusion blow molding process of the present invention, a heat-treated, liquid crystalline polymer is heated to a molten state. We have found that even though it is heated past its melting point, the heat-treated polymer exhibits significant melt-strength enhancement during parison formation.

In any event, in accordance with the process, the polymer is heated to a temperature above its melting point suitable for extruding a well-formed parison, and is maintained at this temperature until extrusion of the parison has taken place. This temperature may be attained by the combination of heat provided to the extruder and shear-induced heat generated during the extrusion process. The compression ratio of the extruder screw affects the heat generated by shear, with a relatively higher compression ratio resulting in enhanced shear-induced heat.

As may be understood, a suitable extrusion temperature will be greater than the temperature at which polymer solidification would take place but less than the temperature at which polymer degradation would occur or at which the parison would be unstable and sag or stretch, resulting for instance, in a highly non-uniform wall thickness. It will be understood that each heat-treated, liquid crystalline polymer will have its own operative temperature range for extrusion blow molding. Typically, by extruding the polymer at as low a temperature as possible, melt strength will be maximized.

When in accordance with the present invention, the necessary melt strength enhancement is provided and the molten polymer is extruded at an appropriate temperature, a well formed parison is produced. Otherwise, the parison may have inconsistent wall thickness with local weakness.

In accordance with the extrusion blow molding process of the present invention, intermittent or continuous extrusion may be used. A shot of molten polymer is extruded through an annular gap, generally downward into space. Beneficially, intermittent extrusion periodically forms parisons after molten polymer is accumulated, and permits the extrusion of a large volume of molten plastic in a short period of time. Larger parts or structures may be produced.

Sag resistance and stability of a parison in a gravity hung, molten or near molten state are focal points of an extrusion blow molding process having broad applicability in accordance with the invention. Parison hang time will vary depending upon the parison size, the heat-treated LCP selected, the die gap, and the rate of parison formation. Typically, compared to continuous extrusion blow molding, the hang time for intermittent extrusion blow molding may be significantly less in producing a part or structure of equal size. In making larger parts and structures, the heat-treated LCP will be extruded at a temperature that appropriately provides sag resistance for an increased polymer mass.

At an appropriate time, typically after the parison has fallen to a selected length, a forming mold is clamped around the parison. The mold is typically clamped around a center portion of the parison, and the clamped parison remains connected to the extruder. A fluid such as air, which may be preheated or cooled, is then blown into the clamped parison to form a molded part or structure. After a suitable mold hold time, the mold is opened and the formed part or structure is removed.

Accordingly, by the present invention, a broadly applicable method of extrusion blow molding a liquid crystalline polymer, is provided. Without a heat-treated LCP or without the selection of an appropriate temperature for extrusion, extrusion blow molding of large-sized parts or structures from LCPs can be expected to be unsuccessful.

In an application of the extrusion blow molding process of the present invention using periodic parison formation, a heat-treated, liquid crystalline polymer is extruded at an appropriate temperature to form a stable parison, and the parison is blow molded to provide a gas barrier, inner liner.

The forming mold may be heated, and as a result, resin content of the liner exterior surface may be increased. In other applications, a heated mold may beneficially provide an improved match of the exterior surface of the part or structure to the inner mold surface. In any event, we have found, generally speaking, that a mold temperature on the order of about 200 to 350° F., and perhaps beyond 350° F., is suitable when extrusion blow molding a heat-treated LCP having a melting point in the range of about 280 to 310° C. Too hot a mold may result in detrimental blister formation.

Thereafter, using the liner as a mandrel, a conventional structural overwrap may be filament wound and consolidated onto the liner. Reference is hereby made to U.S. Pat. No. 5,150,812 to Peter M. Adams, which describes that an inner liner may be made by blow molding or filament winding, and may be formed from an LCP or other gas impermeable polymer.

Schematically illustrated in the drawing is an extrusion blow molding process in accordance with the present invention using an accumulator machine. The accumulator capacity determines the size limit of blown parts. Use of the accumulator permits faster extrusion of a large parison.

In step 1, an extruder 10 feeds molten, heat-treated polymer to an accumulator head 12 having a annular gap (not shown). In the second step, a shot of molten polymer at the selected extrusion temperature, is ejected by a ram 14 vertically downward through the annular gap into space to form a parison 16. Polymer solidification is avoided until after the polymer has been ejected.

In the third step, after the parison has fallen to the desired length, a forming mold 18 is clamped around the parison. In the fourth step, with the mold clamped around the parison, air is forced into the clamped parison, and in the fifth step, after a suitable period of time for cooling, the mold is opened to provide the formed part or structure.

In the Examples that follow and throughout this description and the claims set forth below, all percentages are weight percent unless otherwise specified.

EXAMPLE 1

With reference to the drawing, a Hycon extruder is fed with a melt strength-enhanced, thermotropic LCP made as follows: Vectra ® A910 having a melting point of about 278° C. and commercially available from Hoechst Celanese Corporation of Somerville, N.J., is heated to 230° C. and then held at 230° C. for 4 hours to prepare for heat-treatment, then is heated to 270° C. by increasing the temperature about 12° C./hr., and then is held at 270° C. for 10 hours to provide a ten hour heat-treated LCP. Heat treatment actually is in excess of ten hours. Afterwards, the resin is rapidly cooled to less than 100° C. A nitrogen atmosphere is used. The solid-stated LCP has the melt viscosity shown in the Table, and a melting point of about 303° C.

Operating parameters for extrusion blow molding the heat-treated LCP are as follows: tooling, 3" diameter divergent style; screw compression ratio, 2.25:1; temperature settings: feed, transition and metering portions of extruder, accumulator head, extrusion die, mandril, 500° F.; mold, 220° F.

Molten polymer accumulates within the head and a parison is formed from a shot of polymer melt extruded through the annular gap vertically downward into space. The extruded polymer is at a temperature of about 620° F. A mold in the form of a 5"×11"×½" plaque, is clamped around a center portion of the parison after the parison has fallen to a desired length. The mold has a finely textured interior face opposite to a smooth interior face. After blowing and cooling steps, the mold is opened and the formed part is removed.

The process is repeated by forming a parison from another shot of the polymer melt, clamping the mold around the parison, blowing, and so forth. Hollow panels are formed. The panels conform to specification and weigh about ¾ lb. each.

EXAMPLE 2

The process of Example 1 is carried out using a five hour heat-treated, thermotropic LCP, with modifications in the operating parameters (temperature settings: feed, transition and metering portions of extruder, accumulator head, extrusion die, mandril, 530° F.).

TABLE

| Ex. | Melt Viscosity, Poise | Temp., °C. | Load, Kg. |
|---|---|---|---|
| 1 | 18,890 | 390 | 15 |
|   | 54,110 | 390 | 5 |
| 2 | 8,940 | 390 | 5 |
| 3 | 6,050 | 390 | 5 |
|   | ca. 32,000 | 310 | 5 |
| 5 | 3,580 | 310 | 5 |
|   | 14,490 | 310 | 1 |
| C-1 | 3,380 | 310 | 1 |

"C-1" means Comparative Example 1.

In addition, a high compression ratio screw (3.5:1) at higher rpms (75 rpm) is used for greater shear, and the forming mold is heated to 300° F. The solid-stated LCP is made as in Example 1 except that the hold time at 270° C. is five hours. The LCP has the melt viscosity shown in the Table, and a melting point of 309° C.

Processing and parison stability are improved, and there is good moldability, compared to Example 1. A temperature around 587° F. for the extruded polymer yields the most stable parison and process. The panels are found to be to specification, to have good surface detail on one face, but to imperfectly replicate the smooth surface of the mold. Larger head tooling is indicated.

EXAMPLE 3

The process of Example 1 is carried out using a three hour heat-treated, thermotropic LCP, with modifications in the operating parameters (tooling, 4" divergent; temperature setting, feed portion of extruder, 490° F.). A high compression ratio screw (3.5:1) at higher rpms (75 rpm) is again used, and the mold is again heated to 300° F. The solid-stated LCP is made as in Example 1 except that the hold time at 270° C. is three hours. The LCP has the melt viscosity shown in the Table, and a melting point of 301° C.

The molten polymer is found to process well at an extrudate temperature of 550° F. Very good moldability is indicated by the formed parts. The part weights are consistent. The process is versatile enough to run a larger part.

EXAMPLE 4

The process of Example 3 is repeated using an LCP provided by blending 25 wt. % of a heat-treated LCP with 75 wt. % of a thermotropic LCP commercially available under the trade name Vectra® A950 from Hoechst Celanese Corporation of Somerville, N.J. The heat-treated LCP is made by combining similar amounts of three hour heat-treated Vectra®A 910 and five hour heat-treated Vectra®A 910. A high compression ratio screw (3.5:1) is again used, but the mold is heated to only 250° F.

The molten polymer is found to process best at a temperature of 558 or 563° F. The panels are found to be to specification, but indicate not as good moldability as in Example 3.

EXAMPLE 5

The process of Example 1 is carried out using a one-half hour heat-treated, thermotropic LCP, with modifications in the operating parameters (tooling, 3.5"; mold, 250° F.). The solid-stated LCP is made as in Example 1 except that the hold time at 270° C. is one-half hour. The LCP has the melt viscosity shown in the Table.

As with prior heat-treated resins, parisons having a slightly rough surface are formed. The molten polymer is found to process well at an extrudate temperature of 551° F. Good moldability is indicated by formed parts. The process may be versatile enough to run a larger part.

COMPARATIVE EXAMPLE 1

The process of Example 1 is carried out using Vectra® A910, with modifications in the operating parameters (temperature settings: feed, transition and metering portions of extruder, accumulator head, extrusion die, mandril, 465° F.; mold, 200° F.). The untreated LCP has the melt viscosity shown in the Table.

A temperature of about 517° F. for the extruded polymer produces no part. Adjustment of the temperature settings to provide extruded polymer having temperatures of about 586° F., 535° F. and 510° F., likewise produces no part.

The melt viscosity values shown in the Table are obtained when the respective polymer is held at the indicated temperature for 360 seconds with the indicated shear-inducing load.

COMPARATIVE EXAMPLE 2

The process of Example 5 is repeated using a thermotropic LCP commercially available under the trade name Vectra® B950 from Hoechst Celanese Corporation of Somerville, N.J., with modifications as follows: temperature settings: feed portion of extruder, 495° F.; transition portion of extruder, 490° F.; metering portion of extruder, accumulator head, die tip, 485° F.

The LCP has substantially increased melt viscosity compared to Vectra® A910, but is found to have poor melt strength even at temperatures of 540° F., which is near the low end of the processing range. Very dark caramel colored streaks are found in the formed parts and the interior surface appears to be degraded. The high melt viscosity polymer is considered not to be useful in the process of the present invention.

EXAMPLE 6

A Kautex accumulator extruder is fed with a three hour heat-treated, thermotropic LCP. The solid-stated LCP is made as in Example 1 except that the hold time at 270° C. is three hours. Operating parameters are as follows: tooling, 4.33" divergent; compression ratio, 2.25:1; temperature settings: feed portion of extruder, 560° F., transition portion of extruder, 550° F., metering portion of extruder, accumulator head and die tip, 540° F.; mold, 250° F.

Molten polymer accumulates within the head and a parison is formed from a shot of polymer melt extruded through the annular gap vertically downward into space. The polymer runs well at a temperature of about 551° F. A test mold in the form of an 18" long, 6" diameter container having 1" long, 1" diameter threads at each end, is clamped around the parison after the parison has reached a desired length. After the blowing and cooling steps, the mold is removed and the successfully formed part is removed from the extruder.

The process is repeated by forming a parison from another shot of the polymer melt, clamping the parison and so forth. The parison surface is smoother than that of parisons of the prior Examples. The cycle time is 90 seconds overall.

The formed containers have wall thickness variations from 0.065" to 0.095" per container due to a rough inner wall, and average about 1.75 lbs. The exterior surface is smoother than the smooth surface of a blow-molded panel of the prior Examples. Very good blow moldability is indicated. A mold hold time of about 55 seconds provides improved thread definition.

The benefit of extrusion blow molding a heat-treated, thermotropic LCP, is clearly shown by the foregoing examples. A blend of a heat-treated LCP and a conventional polymer may also be advantageously used.

The process of the present invention may be carried out with various modifications without departing from the spirit or essential attributes thereof, and accordingly, reference should be made to the appended claims, rather than to the foregoing specification as indicating the scope of the invention.

We claim:

1. A method for extrusion blow molding a liquid crystalline polymer, said method comprising the steps of; heat-treating a liquid crystalline polymer so to enhance the melt strength of said polymer, said heat-treatment being conducted at a temperature near said polymer's melt temperature; melting said heat-treated liquid crystalline polymer at a suitable parison-forming temperature; forming a parison by vertically extruding the polymer melt generally downward into space; clamping a forming mold around said parison; blowing gas into the clamped parison to form a molded part; and opening said mold to provide the formed part.

2. The extrusion blow molding method of claim 1, wherein said liquid crystalline polymer is a polyester.

3. The extrusion blow molding method of claim 1, wherein said liquid crystalline polymer is a wholly aromatic polyester.

4. The extrusion blow molding method of claim 1, wherein said liquid crystalline polymer is a wholly aromatic polyester made from p-hydroxybenzoic acid and 6-hydroxy-2-naphthoic acid monomers.

5. The extrusion blow molding method of claim 1, wherein said liquid crystalline polymer is a thermotropic liquid crystalline polymer.

6. The extrusion blow molding method of claim 1, wherein said forming mold is heated.

* * * * *